Figure 1:
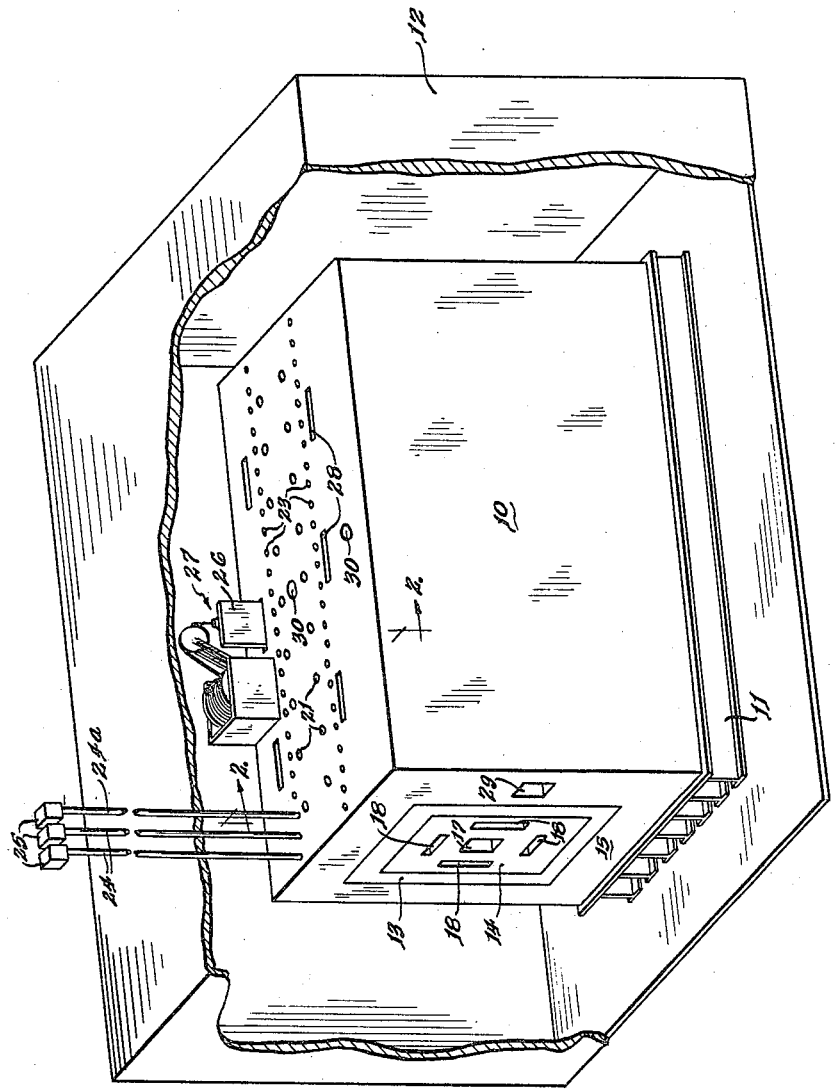

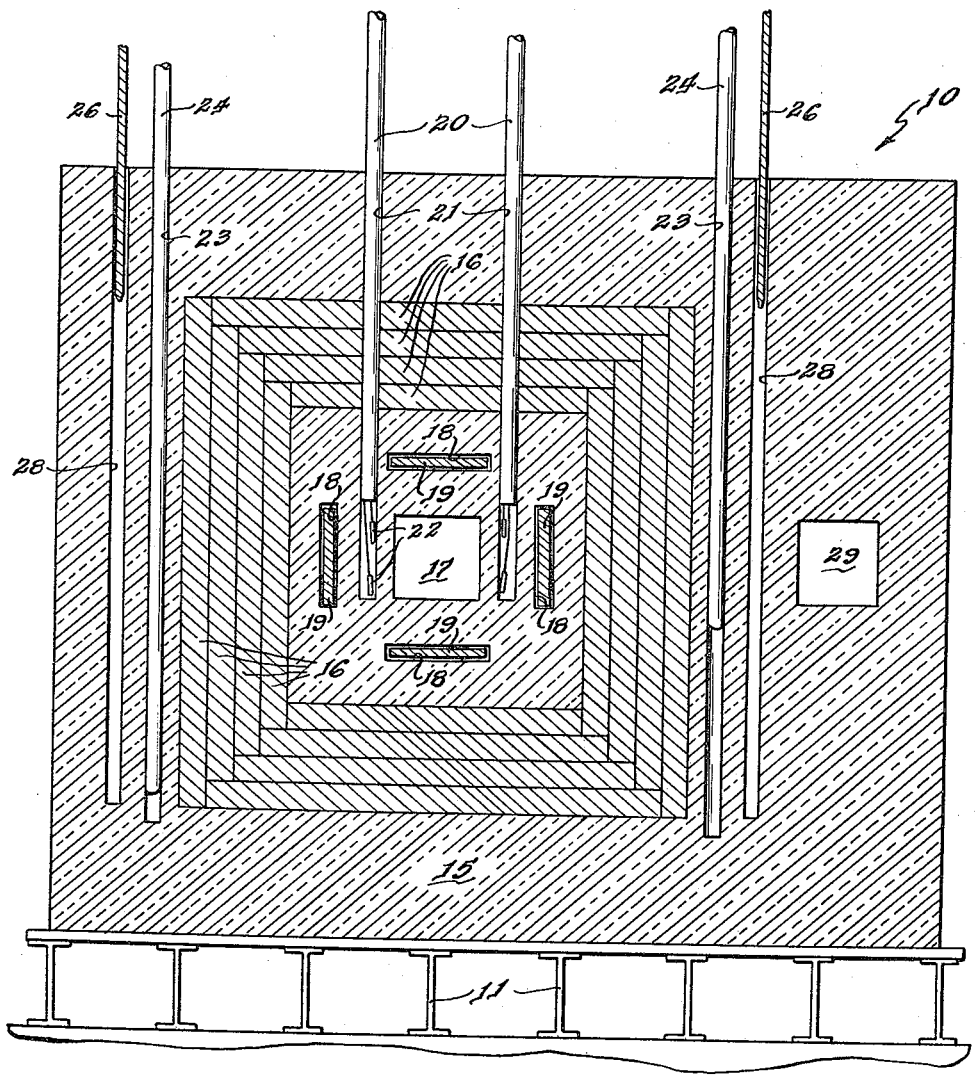

3,070,538
FUEL ASSAY REACTOR
Bernard I. Spinrad, Naperville, Henry A. Sandmeier, Chicago, and Frederick H. Martens, Plainfield, Ill., assignors to the United States of America as represented by the United States Atomic Energy Commission
Filed May 19, 1961, Ser. No. 111,409
6 Claims. (Cl. 204—193.2)

This invention relates to a nuclear reactor which is useful for determining the fuel and parasitic absorber content and the fuel distribution in thermal reactor fuel elements.

As operating nuclear reactors become more widely distributed throughout the world, commerce in fuel elements for these reactors becomes more important, particularly since many countries that operate reactors cannot make the investment necessary to construct a plant for fabricating the required fuel elements. With the increase in exchange of fuel elements between nations and the advent of a multiplicity of producers within some nations, it becomes necessary to establish accounting procedures to control and monitor the transfer of nuclear materials. For quantitative material control therefor, the fissionable material content of assembled fuel elements must be measured.

It is also necessary that fuel distribution be checked because nonuniformities in the fuel element may occur without the manufacturer's knowledge. Also it sometimes happens that neutron absorbers are introduced accidentally into the fuel element while it is being prepared.

To determine fissionable material content and distribution and neutron absorber content, it is obviously necessary that the assembled fuel element be tested nondestructively prior to its use. Fuel elements can be tested by introducing them into a nuclear reactor or critical assembly and measuring the perturbation in neutron flux caused thereby and critical assemblies now exist which are used for this purpose in extremely specialized cases, such as the testing of components designed for insertion into a particular production reactor.

It is desirable, however, to construct a facility within which fuel elements from a wide variety of reactors can be tested and which has maximum sensitivity to minute variations in fissionable material content and distribution and the neutron absorber content.

It is accordingly the object of the present invention to develop a nuclear reactor having maximum sensitivity to perturbations in neutron flux.

It is also an object of the present invention to develop a nuclear reactor which is uniquely suitable for assaying reactor fuel elements for content and distribution of fissionable materials and parasitic absorbers.

It is a further object of the present invention to develop a fuel assay nuclear reactor within which fuel elements of a wide variety of shapes, sizes and fuel enrichments can be tested.

These and other objects of the present invention are attained by a graphite-moderated, graphite-reflected, highly-enriched, uranium-fueled reactor incorporating an annular fuel zone, internal and external reflectors, a large test opening in the internal reflector, and a shutter of graphite impregnated with boron between the fuel zone and the large test opening and wherein the uranium content of the fuel zone is graded upwardly from the outside to the inside thereof.

The invention will next be described with reference to the accompanying drawings wherein:

FIG. 1 is a perspective view of a nuclear reactor according to the present invention, and FIG. 2 is a sectional view taken in the direction of the arrows 2—2 in FIG. 1.

Referring now to the drawing, the reactor comprises a core 10 which is supported on I-beams 11 and which is contained in an enclosure 12 within which a carbon dioxide atmosphere is maintained. Core 10 is 10 feet in length, 6 feet in height, and 7 feet in width.

Core 10 comprises a rectangular annular fuel zone 13, an internal reflector 14 disposed within the fuel zone 13, and an external reflector 15 disposed around the fuel zone 13. Fuel zone 13 is 4 feet square with a 2 foot 4 inch square opening therein and extends the full length of the core 10. Fuel zone 13 is off-center in the core 10 to the extent that the external reflector 15 is one foot thick on one side and two feet thick on the other side of the active portion.

Fuel zone 13 is composed of concentric layers of 2½-inch square bars 16 framing the internal reflector 14 located therewithin; each layer consists of opposed rows of abutting vertical bars 16 and opposed rows of horizontal bars extending between the ends of the vertical bars. Fuel bars 16 are retained in place by reflectors 14 and 15.

Fuel bars 16 are composed of graphite impregnated with highly-enriched uranium in the form of uranium dioxide. Methods for their preparation are described in proceedings of the Second International Conference on the Peaceful Uses of Atomic Energy, volume 10, pages 462 and 463. One of the more important aspects of the present invention is that a different concentration of uranium is employed in the fuel bars 16 making up different layers of the fuel zone 13. The concentration of uranium in the innermost layer is higher than it is in the next layer and so on to the outermost layer which has the lowest concentration. The concentration in the innermost layer is 2.86 mg. $U^{235}$/cm.$^3$; in the next layer it is 1.94 mg. $U^{235}$/cm.$^3$; in the next layer it is 1.07 mg. $U^{235}$/cm.$^3$; and in the outer layer it is 0.55 mg. $U^{235}$/cm.$^3$. It is by this means that maximum sensitivity of the reactor is attained, as will be shown hereinafter. The total amount of fuel employed is 5.2 kilograms enriched uranium in the form of $UO_2$.

Internal reflector 14 has an 8 inch by 8 inch test opening 17 at the center thereof extending longitudinally the length of the core. Four slots 18 are symmetrically distributed about the test opening 17 parallel to the sides thereof and also extend the length of the core. The width of the slots 18 is greater than the width of the test opening. Slabs 19 impregnated with boron are shown in place in slots 18 as they appear during a part of the testing procedure hereinafter described. Slabs 19 collectively constitute a shutter which is capable of drastically changing the neutron flux spectrum in the central test opening 17.

Located adjacent to the test opening 17 are 18 instrumentation thimbles 20 disposed in a like number of vertical wells 21. Vertical wells 21 are equispaced in two rows parallel to and on opposite side of test opening 17, and extend to the bottom of the test opening. Fast and slow neutron detectors 22 are located in thimbles 20.

Vertical openings 23 are located in external reflector 15 just outside active portion 13. These openings 23 are disposed in rows running parallel to the fuel annulus 13. There are 25 equispaced openings 23 in each row and the openings extend down to the bottom of the fuel zone 13. Control elements 24 are vertically reciprocable within openings 23 by means of control element drives 25. Control elements 24 are ⅜ inch iron tubes which are closed at the bottom. Neutron-absorbing liquids, such as solutions of boric acid in water, may be introduced into the tubes so that the neutron-absorption characteristics of the control elements 24 can be varied. One of the control elements 24, denoted 24a, is calibrated so that its position in the reactor can be measured accurately. This control element is operated by an automatic flux control system (not shown) which maintains the flux constant in the reactor. A large number of control elements 24 each controlling a small amount of reactivity are used to keep the flux throughout the reactor at a uniform shape while achieving a wide range of reactivity control. Each control element except element 24a is always maintained in a fully in or fully out position.

Saftety elements consisting of a plate 26 of a material of high neutron-absorption cross section, such as cadmium, operated by drive means 27 are disposed just outside control elements 24 and operate in vertical slots 28.

An additional test opening 29 is provided in external reflector 15 in the wider portion thereof outside of the safety plates 26. Likewise vertical test openings 30 are at the center of the core 10 and in the center of the wider portion of the external reflector 15. The use of opening 29 will be described hereinafter. Openings 30 are auxiliary openings provided for the purpose of making the reactor of more general use. They are not needed when assaying fuel elements.

Operation of the reactor is conventional. Its use in assaying the fuel and poison content of a fuel element will next be described. The automatic flux control method of determining reactivity is employed because it is simpler than other methods of determining small reactivities and because it is slightly more precise. According to this method the flux in the reactor is kept at a constant value by positioning a control rod automatically in response to a signal from a neutron detector. This demands that the reactor be critical at all times. The change in reactivity due to a change in sample is reflected in the change in the automatic control tube position. By accurately measuring this position the change in reactivity is determined. Thus it is evident that the method involves a measurement of the difference in reactivity between the fuel element to be tested and a standard fuel element. The system described is capable of measuring the fuel content of any fuel element now in use to 0.1%.

Since there are two unknowns, fissionable material content and parasitic absorber content, two tests must be made on each element to separate the two effects. To measure the fuel and absorber content of a fuel element a standard fuel element whose fuel content is known is inserted in test opening 17. The reactor is maintained just critical at a low power level such that a coolant is not needed—for example 10–100 watts. When the standard fuel element is placed in test opening 17 a number of control elements 24 are inserted into the reactor to maintain control over the additional reactivity arising from the addition of the standard fuel element. The only control tube which is not all the way in or all the way out of the reactor is control tube 24a.

The position of control tube 24a is noted. Then the standard fuel element is removed and the element to be tested is inserted. If the amount of fissionable material in the test element is different from that in the standard element, control tube 24a takes a new position. The difference in position is a function both of the amount of fissionable material in the fuel element and of the absorber content. To discriminate between fuel and absorber, slabs 19 are inserted in slots 18 and the position of the control tube 24a is again noted with the standard and the test fuel element in test opening 17. Since the slabs 19 act as a shutter changing the neutron flux spectrum in the test opening, a new measurement of position of control rod 24a makes it easy to compute the fissionable material and absorber content of the test fuel element.

Neutron detectors 22 are employed to determine distribution of fuel and poison through the length of the fuel element. Again comparison between a standard and the test fuel element with slabs 19 in place and out of the reactor is employed and the readings given by detectors 22 at various points along the length of the test fuel element can be readily interpreted in terms of nonuniformity of fuel or poison content in the test fuel element.

Rather than employing slabs 19 to change the neutron flux impinging on the test fuel element, a different location can be used. The test element can be inserted into opening 29 and the difference in location of control tube 24a when the test element is in this opening compared with when it is in opening 17 can be interpreted in terms of fuel and poison content. This last method is not as sensitive as the method employing slabs 19 but may be useful particularly when single fuel elements of a number of different types are being tested to avoid the necessity for frequent insertions and removals of slabs 19—a laborious and time-consuming operation.

To ensure that each fuel element inserted into the test openings is in exactly the same location—preferably, of course, the exact center—inserts must be used. To put the vacant space in the test opening not filled by the test fuel elements to use and to ensure that there is no flux distortion in the immediate environment of the fuel elements, inserts of graphite which just fit into openings 19 and 29 and just accept one type of fuel element are prepared. When fuel elements of different types are inserted into the test openings, different inserts are used. Use of the inserts as described is not mandatory but is preferable for optimum results.

Because of self-shielding many fuel elements have to be tested with the fuel element immersed in a water moderator. The water moderator thermalizes fast neutrons inside the fuel element thereby diminishing the self-shielding effect. To accomplish this the fuel element is placed in a tray filled with a standard amount of water and it is this unit which is inserted into the test opening.

A theoretical analysis of various fuel loadings was made to determine whether a nonuniform distribution of fuel radially of the core increased sensitivity of the reactor. The following table gives the results of this analysis.

| Percent fuel in core region | | | | Critical mass $M_c$ (kg.) | $\frac{\Delta k}{k}/\Delta M$ $\Delta M = 100$ g. $U^{235}$ |
|---|---|---|---|---|---|
| I | II | III | IV | | |
| 59 | 30 | 8 | 3 | 3.4 | $1.83 \times 10^{-4}$ |
| 43 | 31 | 18 | 9 | 3.6 | $1.80 \times 10^{-4}$ |
| uniform | | | | 4.0 | $1.69 \times 10^{-4}$ |
| 9 | 18 | 31 | 43 | 4.6 | $1.52 \times 10^{-4}$ |

The analysis applies to an internally and externally reflected cylindrical core of $U^{235}$ encased in aluminum with a graphite moderator. The internal reflector is 18 inches in radius, the fuel annulus is 18 inches in thickness and the external reflector is 79 inches in thickness. Core region I is the region from 9 to 15.8 inches from the center of the reactor; core region II is the region from 15.8 to 20 inches; core region III is the region from 20 to 24 inches; core region IV is the region from 24 to 27 inches.

It is thus seen that $$\frac{\Delta k}{k}/\Delta M$$

is lowest when the fuel is concentrated in the outer layers of the active portion 13 of the reactor and highest when the fuel is concentrated in the inner layers of the active portion. This shows that sensitivity is higher under the last set of conditions than it is either when the fuel is distributed uniformly or when it is concentrated in the outer layers.

In order to be capable of performing as a fuel assay reactor, the reactor must be of an extremely stable configuration. The parameter which is measured is the reactivity. If there are phenomena which change this reactivity, then this change will be reflected as an error in the fuel content of the test element.

There are three phenomena known which might cause short-term instability. The first of these is changes in the barometric pressure. This phenomenon is obviated by maintaining the reactor in an atmosphere of carbon dioxide in enclosure 12. Since the neutron-absorption cross section of carbon dioxide is very low, changes in barometric pressure affect reactivity very slightly. Air on the other hand is 76% nitrogen which has a high absorption cross section so that if the reactor were operated in air the volume of nitrogen penetrating pores in the graphite would vary with barometric pressure, thereby changing the reactivity.

Another phenomenon which affects reactor stability is temperature. Since the reactor must have a negative temperature coefficient for safety, changes in temperature affect the reactivity of the reactor. This condition is taken care of by maintaining the room in which the reactor stands at a constant temperature.

The third factor which can cause short-term drift is mechanical. All components are clamped rigidly in place to obviate any movement. And all but one of the control tubes is in either one of two positions, either in or out. There are stops on the control tubes (not shown) so that they will reproduce these positions exactly.

One of the problems of a fuel assay reactor which has been solved in the herein-described reactor is the fact that the insertion of a test fuel element will cause a tremendous change in reactivity of the system; approximately 12% $\Delta k/k$. The reactor is designed so that the reactor is kept critical at all times during insertion and removal of test fuel elements to prevent delays while waiting for delayed neutron precursors to attain equilibrium and so that a large reactivity change can be followed by the control system with sufficient shutdown for safety. A large number of control rods is therefore employed both for the foregoing purpose and to keep the flux pattern in the reactor unchanged by the different insertions. Although the iron control elements 24 will normally be sufficient control, introduction of a neutron-absorbing liquid into these tubes makes it possible to take up any desired amount of reactivity in the tubes. It may be necessary to use such an expedient if a very large fuel element having a large amount of reactivity is to be tested.

The reason for employing an internally and externally reflected reactor is that the sensitivity to fissionable materials and absorber is increased if there is a dominant peaking of the thermal flux at the center of the reactor. This is accomplished by accumulating moderator in a central region which is often called a flux trap. The internal reflector also provides enough space surrounding the test element so that spectral changes in a nonfuel region may be produced in order to discriminate between fissionable and absorbing materials.

It will be understood that this invention is not to be limited to the details given herein but that it may be modified within the scope of the appended claims.

What is claimed is:

1. A nuclear reactor having maximum sensitivity to perturbations comprising a core consisting of a horizontally disposed, rectangular, annular fuel zone containing enriched uranium dioxide dispersed in graphite, the concentration of uranium dioxide increasing from the outside to the inside of the fuel zone, an internal reflector of graphite containing an axial test opening disposed within the fuel zone, an external graphite reflector, means for changing the neutron spectrum in the test opening, and means for measuring perturbations in the neutron flux caused by the introduction of different fuel elements into the test opening.

2. A nuclear reactor having maximum sensitivity to perturbations comprising a core consisting of a horizontally disposed, rectangular, annular fuel zone containing enriched uranium dioxide dispersed in graphite, the concentration of uranium dioxide increasing from the outside to the inside of the fuel zone, an internal reflector of graphite containing an axial test opening disposed within the fuel zone, an external graphite reflector, means for changing the neutron spectrum in the axial test opening comprising a plurality of slabs of a neutron-absorbing material capable of being inserted in slots in the internal reflector around the axial test opening, a plurality of control elements disposed in rows running parallel to the fuel zone and just outside the fuel zone, one of said control elements being automatically controlled to maintain a predetermined neutron flux in the reactor and being calibrated so that its position in the reactor can be measured.

3. A nuclear reactor having maximum sensitivity to perturbations comprising a core consisting of a horizontally disposed, rectangular, annular fuel zone containing enriched uranium dioxide dispersed in graphite, the concentration of uranium dioxide increasing from the outside to the inside of the fuel zone, an internal reflector of graphite containing an axial test opening disposed within the fuel zone, an external graphite reflector, means for changing the neutron spectrum in the axial test opening comprising a plurality of slabs of a neutron-absorbing material capable of being inserted in slots in the internal reflector around the axial test opening, a plurality of control elements disposed in rows running parallel to the fuel zone and just outside the fuel zone, one of said control elements being automatically controlled to maintain a predetermined neutron flux in the reactor and being calibrated so that its position in the reactor can be measured, and a plurality of instrumentation thimbles containing neutron detectors disposed in vertical wells which are disposed in two rows parallel to and on opposite sides of the axial test opening and are closely adjacent thereto.

4. A nuclear reactor having maximum sensitivity to perturbations comprising a core consisting of a horizontally disposed, rectangular, annular fuel zone containing enriched uranium dioxide dispersed in graphite, the concentration of uranium dioxide increasing from the outside to the inside of the fuel zone, an internal reflector of graphite containing an axial test opening disposed within the fuel zone, an external graphite reflector, means for changing the neutron spectrum in the axial test opening comprising a plurality of slabs of a neutron-absorbing material capable of being inserted in slots in the internal reflector around the axial test opening, a plurality of control elements disposed in rows running parallel to the fuel zone and just outside the fuel zone, one of said control elements being automatically controlled to maintain a predetermined neutron flux in the reactor and being calibrated so that its position in the reactor can be measured, a plurality of instrumentation thimbles containing neutron detectors disposed in vertical wells which are disposed in two rows parallel to and on opposite sides of the axial test opening and are closely adjacent thereto, and safety elements disposed in rows just outside the control elements.

5. A nuclear reactor according to claim 1 in which said fuel zone consists of a plurality of concentric layers of bars of uranium dioxide dispersed in graphite, each of said layers having a different concentration of uranium therein, the lowest concentration being in the outside layer and the highest concentration being in the inside layer.

6. A nuclear reactor according to claim 1 wherein the control elements are iron tubes closed at the bottom which can be filled with a neutron-absorbing liquid.

References Cited in the file of this patent

UNITED STATES PATENTS 2,865,826     Stewart _____ Dec. 23, 1958